(12) United States Patent
Inui et al.

(10) Patent No.: US 7,024,507 B2
(45) Date of Patent: Apr. 4, 2006

(54) COMPUTER DEVICE, EXPANSION DEVICE MANAGEMENT METHOD, AND COMPUTER PROGRAM

(75) Inventors: Takashi Inui, Yokohama (JP); Masahiko Nomura, Kirkland, WA (US); Noritoshi Yoshiyama, Yokohama (JP)

(73) Assignee: Lenovo (Singapore) Pty Ltd., Singapore (SG)

( * ) Notice: Subject to any disclaimer, the term of this patent is extended or adjusted under 35 U.S.C. 154(b) by 315 days.

(21) Appl. No.: 10/065,060

(22) Filed: Sep. 13, 2002

(65) Prior Publication Data

US 2004/0015629 A1 Jan. 22, 2004

(30) Foreign Application Priority Data

Sep. 17, 2001 (JP) ............................. 2001-281337

(51) Int. Cl.
*G06F 13/00* (2006.01)

(52) U.S. Cl. ............ 710/300; 710/301; 710/302; 710/303; 710/304; 713/100

(58) Field of Classification Search ........ 710/300–304, 710/100; 713/321, 100
See application file for complete search history.

(56) References Cited

U.S. PATENT DOCUMENTS

| | | | | |
|---|---|---|---|---|
| 5,922,060 | A | * | 7/1999 | Goodrum ............... 710/302 |
| 6,055,595 | A | * | 4/2000 | Tachibana et al. ......... 710/301 |
| 6,115,780 | A | * | 9/2000 | Furuta ................... 710/266 |
| 6,671,748 | B1 | * | 12/2003 | Cole et al. .................. 710/8 |
| 6,711,645 | B1 | * | 3/2004 | Chari et al. ............... 710/302 |
| 2003/0041088 | A1 | * | 2/2003 | Wilson et al. ............. 709/104 |

FOREIGN PATENT DOCUMENTS

| | | |
|---|---|---|
| JP | 01-304529 | 12/1989 |
| JP | 05-119881 | 5/1993 |
| JP | 06-324774 | 11/1994 |
| JP | 2000-009735 | 1/2000 |
| JP | 2000-259546 | 9/2000 |
| JP | 2000-339076 | 12/2000 |
| JP | 2001-222502 | 8/2001 |
| JP | 2002-140140 | 5/2002 |
| JP | 2002-215277 | 7/2002 |

* cited by examiner

*Primary Examiner*—Rehana Perveen
*Assistant Examiner*—Kim T. Huynh
(74) *Attorney, Agent, or Firm*—Winstead, Sechrest & Minic; Carlos Munoz Bustamante (57) ABSTRACT

A user specifies, in advance, the expansion devices which he/she does not want to remove among the expansion devices which are attachable/detachable with respect to the PC, and the specified expansion devices are excluded from a list displayed later for the user to select an expansion device to remove. Besides, whether to display expansion devices in the list is specified to an BIOS and the information referenced by the BIOS is stored in an NVRAM.

15 Claims, 8 Drawing Sheets

COMPUTER DEVICE, EXPANSION DEVICE MANAGEMENT METHOD, AND COMPUTER PROGRAM

FIELD OF THE INVENTION

The present invention relates to a computer device which allows expansion devices to be attached and detached, and a management method for expansion devices.

BACKGROUND OF THE INVENTION

As is well known, personal computers (PCs) allow expansion devices to be attached and detached via interfaces which are based on USB (Universal Serial Bus), PCMCIA (Personal Computer Memory Card International Association), IDE (Integrated Device Electronics), or other standards.

Conventionally, such expansion devices can be attached and detached only after the PC is turned off. However, based on USB or other recent standards, there has been an increasing number of hot-swappable expansion devices, which can be attached and detached freely even when the PC is in use with the power on.

However, even if such expansion devices are removable when viewed from the PC system, there may be cases in which a user does not want to (must not) remove them. For example, during networking with an expansion device (for example, a PCMCIA PC card) with modem capabilities or LAN capabilities mounted on the PC, naturally the user does not want to remove it.

In such cases, if the user removes an expansion device by mistake, the PC system will unload the driver for the expansion device and performs other relevant processes, following normal procedures, to allow the expansion device to be removed. Thus, although there is nothing abnormal for the system, the user will be inconvenienced by the sudden interruption of the network communications.

In this way, if an expansion device which is not hot-swappable—i.e., which cannot be attached or detached with the power on—is unexpectedly removed from the PC, it becomes necessary to attach the expansion device again, reboot the system on the PC, and make the expansion device to be recognized again by a system management function of the OS on the PC. This will take time and labor. Consequently, novice users or the like may not know the procedures and may not be able to continue running the PC.

Even if an expansion device is hot-swappable, it must be attached again. Although this involves no more trouble than when attaching ordinary expansion devices, the fact remains that extra time and labor are required unexpectedly.

The present invention has been achieved in view of the above technical problems. Its purpose is to provide a computer device, an expansion device management method, etc. which can prevent unexpected removal of expansion devices and improve the usability of the PC.

SUMMARY OF INVENTION

To attain the above purpose, a computer device according to the present invention includes information storage which stores settings information which indicates whether or not expansion devices connected to interfaces are removable and a listing display which displays a list of expansion devices removable from the interfaces based on the settings information. Consequently, the expansion devices set to be irremovable are not displayed in the list.

It is also possible to provide a setting change element enabling changing of the settings information based on external requests such as user requests. This will allow users or the like to change settings freely.

Preferably, the information storage is a non-volatile memory which stores information referenced by a BIOS.

Also, a computer device according to the present invention may comprise a listing section for displaying a list based on settings information which indicates whether or not it is to permit removal of an expansion device from each of a plurality of interfaces, a specification acceptance section for accepting specification of a specific interface from among the interfaces contained in the list, and an unloading section for unloading the driver for the expansion device connected to the specific interface to allow the expansion device to be removed.

The listing section may list only the interfaces from which removal of expansion devices is permitted. If the interfaces from which removal of expansion devices is permitted and the interfaces from which removal of expansion devices is not permitted can be identified clearly, it is possible to color-code the two types of interface in the list or indicate the latter type clearly by using strikeout marks or line-through (text decoration).

Incidentally, it is also possible to list the names or the like of interfaces or the names or the like of the expansion devices connected to the interfaces. Furthermore, it is also possible to list only the interfaces to which expansion devices are connected rather than displaying all interfaces.

Also, the specification acceptance section accepts only the specification of the interfaces from which removal of expansion devices is permitted. For example, if interfaces are listed with a clear indication as to whether removal of expansion devices from them is permitted as described above, specification of any interface from which removal of expansion devices is not permitted is invalid, and thus the driver is not unloaded and other related processes are not performed.

Incidentally, choices as to whether or not removal of an expansion device is to be permitted from each of interfaces may be accepted by a choice acceptance section constituted of a setting screen or the like displayed on a monitor.

A management method for expansion devices according to the present invention displays a list of only removable expansion devices explicitly in response to a certain operation, based on list information which indicates whether or not expansion devices are removable, accepts specification of a specific expansion device from among the listed expansion devices, and unloads the specified specific expansion device from the system on the computer device.

The present invention can also be seen as a computer program which makes a computer device execute the processes of detecting expansion devices connected to the computer device, accepting specification as to whether or not it is to prohibit removal of the detected expansion devices from the computer device, and displaying a list of expansion devices, excluding the expansion devices which are prohibited from being removed, when requested to display a list of the expansion devices connected to the computer device. Incidentally, the process of accepting specification is executed if a certain operation is performed during system startup of the computer device.

BRIEF DESCRIPTION OF DRAWINGS

Some of the purposes of the invention having been stated, others will appear as the description proceeds, when taken in connection with the accompanying drawings, in which.

DETAILED DESCRIPTION

Figure 1:
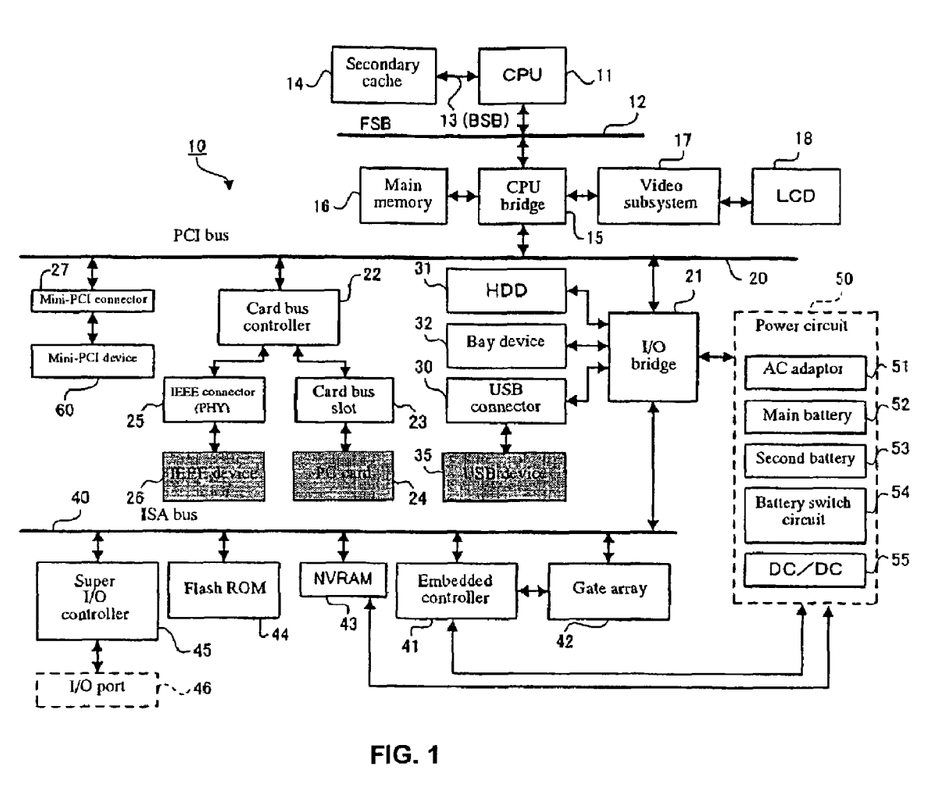
FIG. 1 is a diagram showing a configuration of a PC according to this embodiment.

FIG. 1 shows a hardware configuration of a PC (personal computer: computer device) 10 according to this embodiment. A computer device constituting the PC 10 is configured, for example, as a notebook PC compliant with OADG (Open Architecture Developers' Group) and running a certain OS.

In the PC 10 shown in FIG. 1, a CPU 11, which functions as the brain of the entire PC 10, runs various programs under the control of the OS. The CPU 11 is interconnected with various components via three levels of buses: FSB (Front Side Bus) 12 which is a system bus, PCI (Peripheral Component Interconnect) bus 20 which is a high-speed I/O bus, and ISA (Industry Standard Architecture) bus 40 which is a lowspeed I/O bus. The CPU 11 speeds up processing by storing program code and data in cache memory. Recent CPUs 11 contain approximately 128 K bytes of SRAM as a primary cache. To compensate for shortage of capacity, approximately 512 K to 2 M bytes of a secondary cache 14 is provided via a BSB (Back Side Bus) 13 which is a dedicated bus. Incidentally, the secondary cache 14 may be connected to the FSB 12 instead of using the BSB 13, to avoid a package with a large number of terminals and thereby reduce costs.

The FSB 12 and PCI bus 20 are connected via a CPU bridge 15 called a memory/PCI chip. The CPU bridge 15 includes a memory control function for controlling access to main memory 1 6, a data buffer for absorbing the difference in the data transfer rate between the FSB 12 and PCI bus 20, etc. The main memory 16 is a writable memory used as a read-in area for reading executable programs for the CPU 11 or a working area for writing processing data of the executable programs. The executable programs include various drivers for hardware-controlling the OS and peripheral devices, application programs intended for specific jobs, and firmware such as BIOS stored in flash ROM 44 described later.

A video subsystem 17, which implements video-related functions, contains a video controller. The video controller processes drawing commands from the CPU 11 and writes processed drawing information in video memory as well as reads the drawing information from the video memory and outputs it as drawing data to a liquid crystal display (LCD: listing means or listing section) 18.

The PCI bus 20, which is capable of relatively high-speed data transfer, is connected with an I/O bridge 21, card bus controller 22, and mini-PCI connector 27.

The card bus controller 22 is a dedicated controller for directly connecting bus signals of the PCI bus 20 to an interface connector (card bus) of a card bus slot (interface) 23 as well as to an IEEE connector (PHY: interface) 25 which has capability for data communications with the outside in compliance with the IEEE 1394 standard. A PC card (expansion device) 24 can be mounted detachably in the card bus slot 23 while an IEEE device (expansion device) 26 can be mounted detachably in the IEEE connector 25.

The mini-PCI connector 27 is connected with a mini-PCI device 60, which is an expandable card (board) in compliance with Mini-PCI specification.

The I/O bridge 21 has capability to bridge the PCI bus 20 and ISA bus 40. Interfaces implemented by the IDE interface capabilities of the I/O bridge 21 are connected with a built-in HDD 31, IDE devices such as a CD-ROM drive, and a bay device 32. The bay device 32 allows drives such as FDD and CD-ROM drives as well as an additional HDD to be detachably mounted in a rack called a bay provided in the body of a notebook PC.

The I/O bridge 21 is provided with a USB port, which is connected, for example, with a USB connector 30 installed in a side wall of the body of the notebook PC. The USB (interface) connector 30 can be detachably connected with various USB devices (expansion devices) 35.

Furthermore, the I/O bridge 21 is connected to a power circuit 50, which comprises an AC adaptor 51; battery switch circuit 54 for charging rechargeable (secondary) batteries—a main battery 52 and second battery 53—as well as for switching feed lines from an AC adaptor 51 and batteries; a DC/DC converter (DC/DC) 55 for generating steady DC voltages (5V, 3.3V, etc.) used in the PC 10; and other circuits.

The ISA bus 40 has a lower data transfer rate than the PCI bus 20. It is connected with an embedded controller 41 connected to a gate array 42, NVRAM (non-volatile RAM: non-volatile memory or information storage means) 43 employing CMOS (complementary symmetry metal oxide semiconductor), flash ROM 44, and Super I/O controller 45. Besides, the ISA bus 40 is also used to connect a keyboard/mouse controller or other peripheral devices which operate at a relatively low speed.

The embedded controller 41 controls a keyboard not shown. Also, it is connected with the power circuit 50 and it has a built-in power management controller to share a power management function with the gate array 42.

The NVRAM 43 constantly draws power from the second battery 53 of the power circuit 50 so that stored information will be retained even if the PC 10 is turned off. It stores settings information or the like of the PC 10 system.

The Super I/O controller 45, which is connected with an I/O port 46, drives the FDD and controls input/output of parallel data (PIO) via a parallel port and input/output of serial data (SIO) via a serial port.

On a PC 10 such as the one described above, the OS has a restriction function for restricting removal of expansion devices which are attachable/detachable with respect to the PC 10. According to this embodiment, the restriction function applies to expansion devices such as the PC card 24, IEEE device 26, USB device 35 connected to appropriate interfaces of the PC 10 such as the card bus slot 23, IEEE connector 25, and USB connector 30. However, among IEEE devices 26 and USB devices 35, the restriction function according to this embodiment does not apply to so-called surprise-removable devices which can be attached/detached to/from the PC 10 any time without problems.

Figure 2:
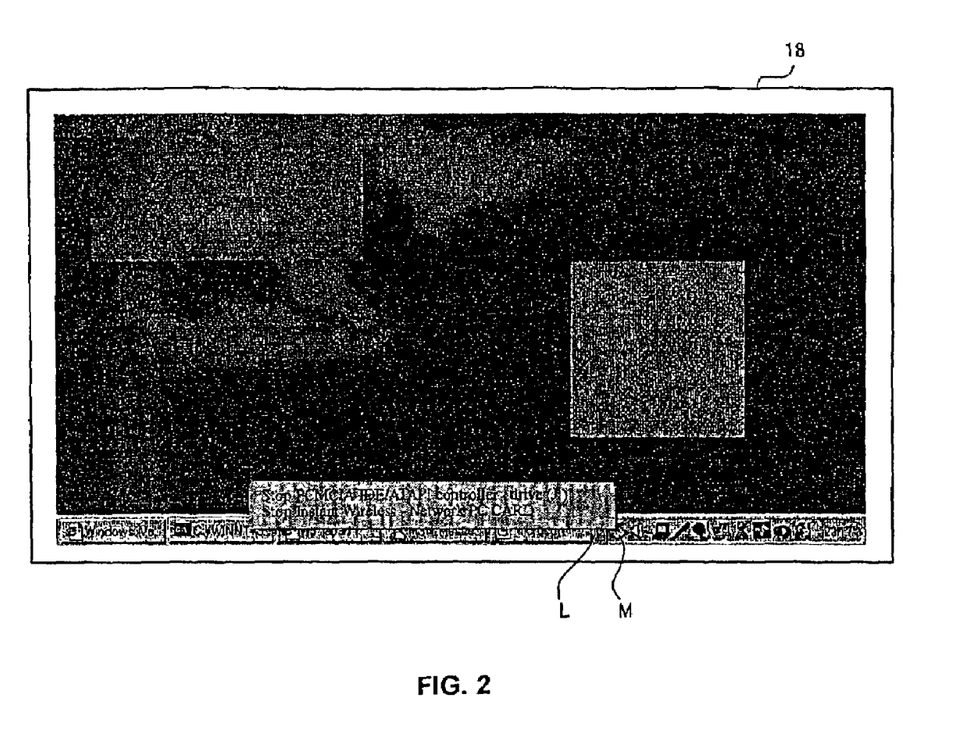
FIG. 2 is an example of a screen displaying a list of removable expansion devices.

As shown in FIG. 2, with this or similar restriction functions, when a user who wants to remove an appropriate expansion device clicks a designated icon M on the LCD 18, a list L of removable expansion devices pops up as a specification acceptance section which accepts user requests to remove expansion devices. When the user selects an expansion device he/she wants to remove, from among the expansion devices contained in the list L, an unloading section of the OS unloads the driver for the selected expansion device and make the expansion device ready to be detached from the system. Then the OS displays a message on the LCD 18, stating that the selected expansion device is ready to be removed. In response, the user removes the selected expansion device from the appropriate interface.

The restriction function described above allows the user to specify what expansion devices to display in the list L. In other words, the expansion devices which the user does not want to remove are not displayed in the list L and their removal process is disabled even if they are connected to the PC 10.

To implement the restriction function, the NVRAM 43 in the PC 10 stores data such as "0" and "1" which represent settings information as to whether PC cards 24, IEEE devices 26, USB devices 35, and other expansion devices can be removed from the card bus slot 23, IEEE connector 25, and USB connector 30.

Figure 3:
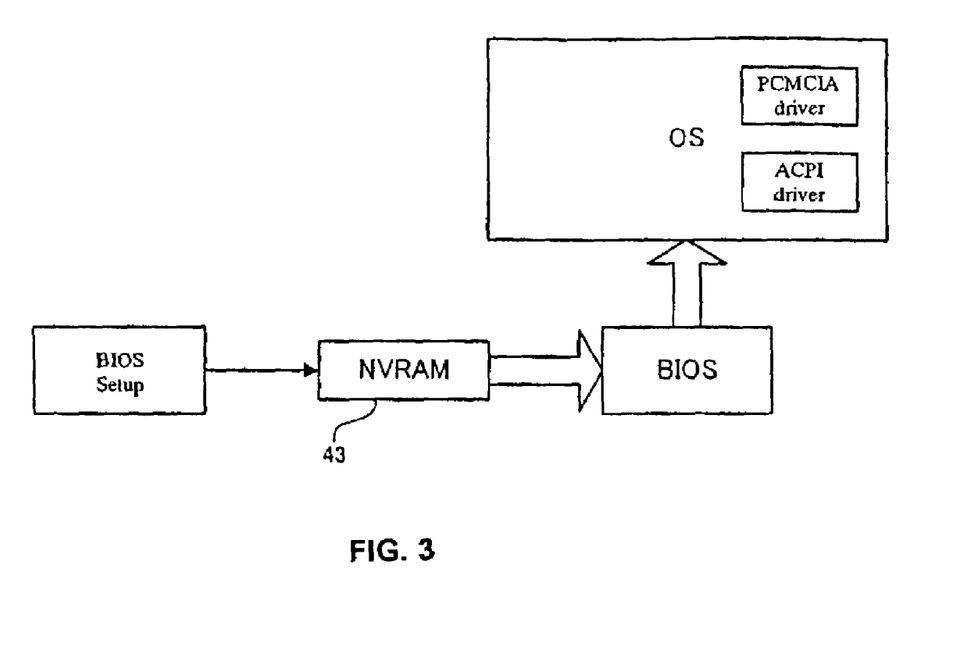
FIG. 3 is a diagram showing a flow of settings/processes for displaying the list shown in FIG. 2.

As shown in FIG. 3, BIOS setup mode, for example, allows the user to configure the restriction function described above and the settings information is stored in the NVRAM 43. The BIOS reads the settings information from the NVRAM 43 during system startup (POST: Power On Self Test) of the PC 10. Then, based on the settings information read out, the OS displays the list L at the user's request or unloads the driver for a specified expansion device in the list L.

Figure 4:
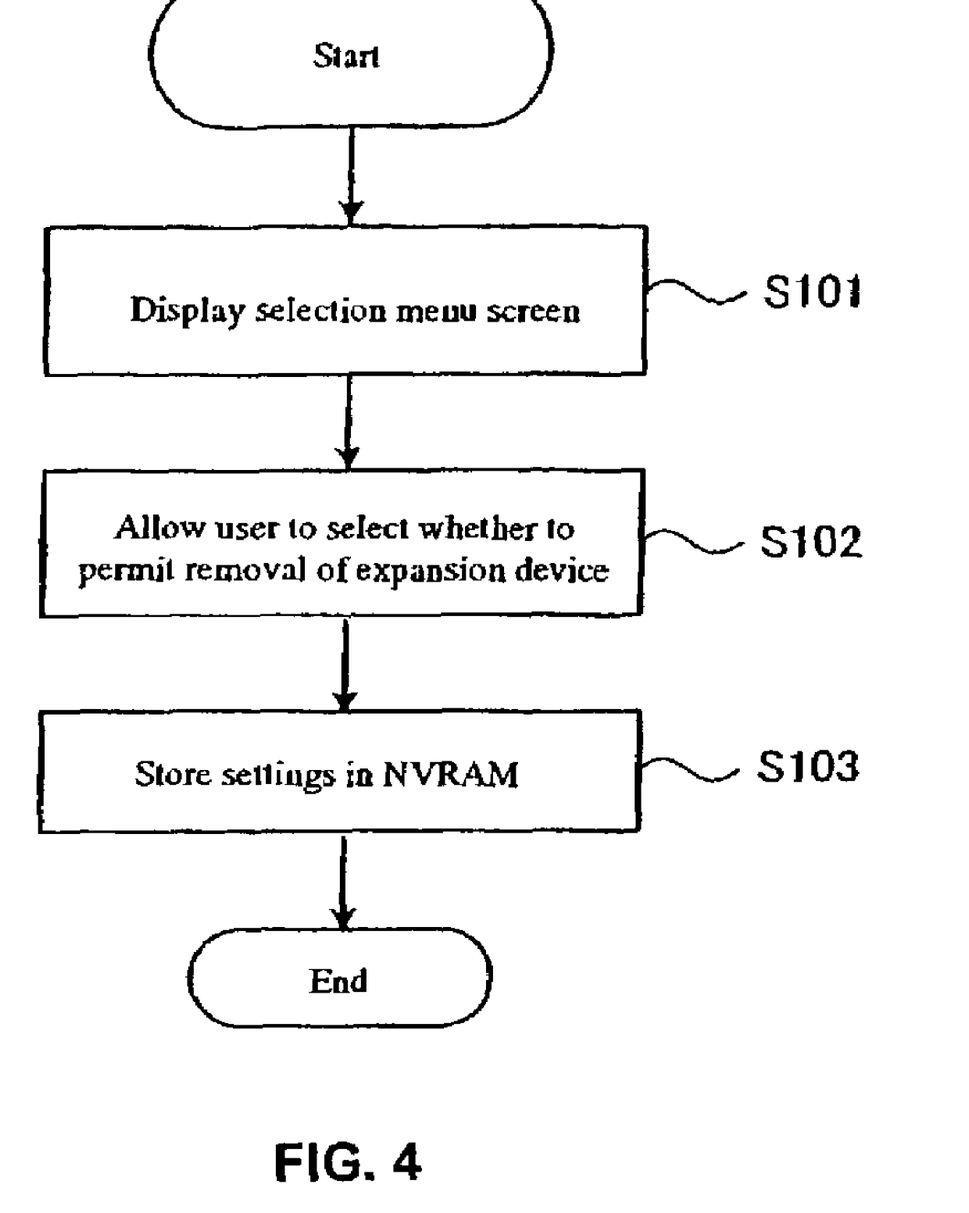
FIG. 4 is a flow of procedure for enabling or disabling removal of the expansion devices.

FIG. 4 shows a flow of processes for accepting user settings to be stored as settings information.

The system on the PC 10 enters the BIOS setup mode as the user performs a particular operation, such as pressing the F1 key, within a certain period during the POST of the PC 10.

Figure 5:
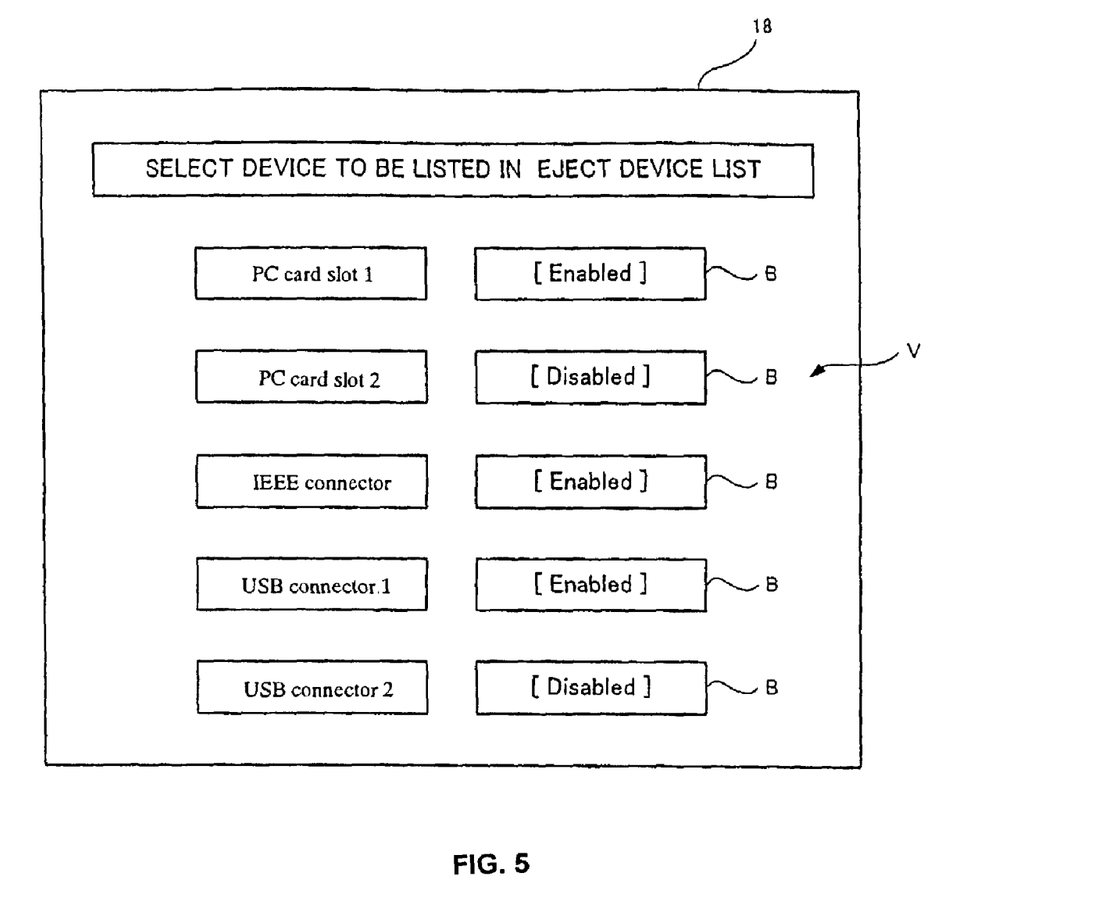
FIG. 5 is a diagram showing an example of a settings screen.

Then, as shown in FIG. 5, a selection menu screen V provided by the BIOS is displayed as a choice acceptance section on the LCD 18 which constitutes a display section of the PC 10. It lists information about the interfaces (the card bus slots 23 (denoted as "PC card slot" in FIG. 5), IEEE connector 25, and USB connectors 30 in the example of FIG. 5) which allow expansion devices to be attached or detached on the PC 10 and which are covered by the expansion device removal restriction function. The selection menu screen V shows buttons B for selecting whether to permit (Enabled) or prohibit (Disabled) removal of expansion devices from the card bus slots 23, IEEE connector 25, and USB connectors 30 (Step S101).

The user selects in the selection menu screen V whether to permit (Enabled) or prohibit (Disabled) removal of an expansion device from each of the interfaces—the card bus slots 23, IEEE connector 25, and USB connectors 30—according to the use form of his/her PC 10 (Step SI 02). Then, the PC 10 accepts the user's selections. In the example of FIG. 5, the user has made such settings that removal of expansion devices from a second card bus slot 23 and second USB connector 30 are prohibited.

The BIOS of the PC 10 stores these settings in the NVRAM 43, a non-volatile memory (Step S103).

Based on the settings information of the restriction function stored in the NVRAM 43 as described above, the PC 10 runs the following processes.

Figure 6:
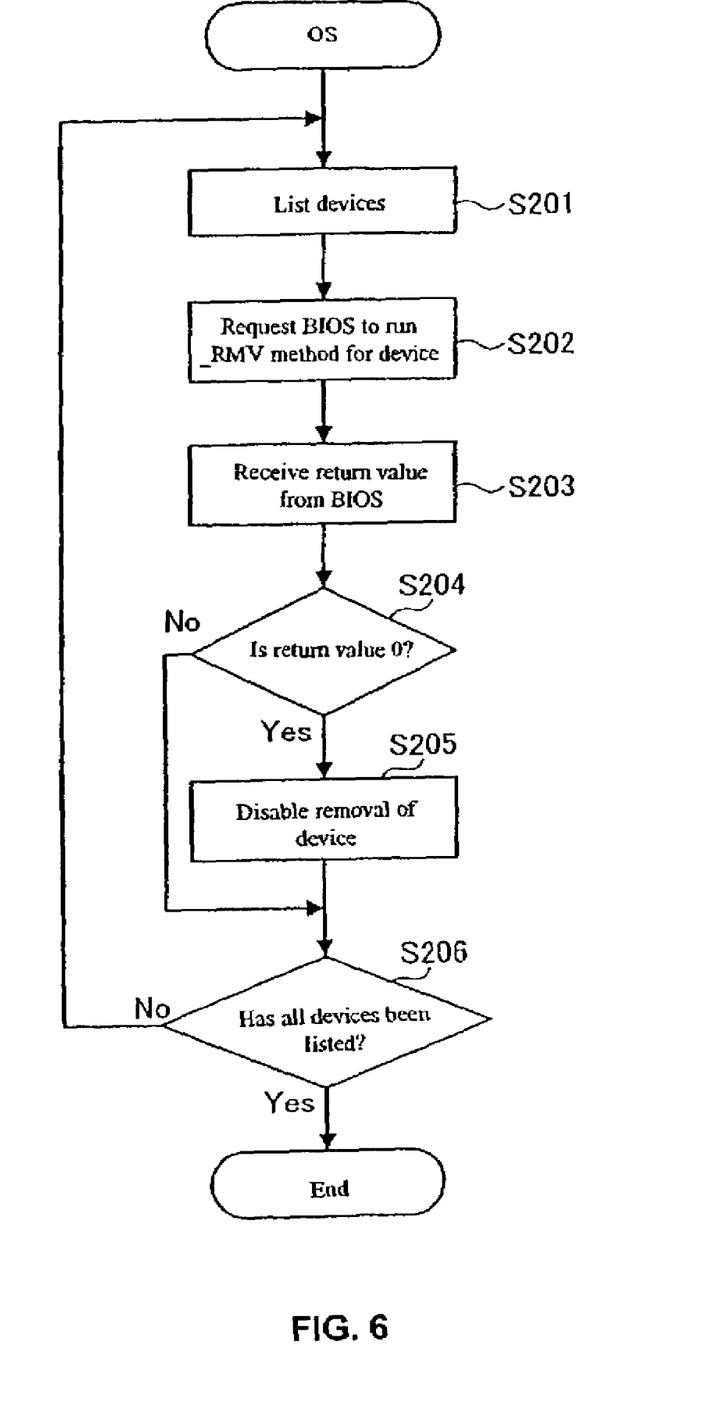
FIG. 6 is a diagram showing a flow of processes executed by an OS when the PC starts up.

As shown in FIG. 6, during the system startup or when there is any change of the system configuration such as attaching to an expansion unit, the OS detects the expansion devices mounted on the PC 10 at that time. Then that part of the OS on the PC 10 which manages expansion devices lists the expansion devices mounted on the PC 10 one by one (Step S201).

While listing expansion devices, the OS requests the BIOS to run a designated procedure, _RMV (Remove) method, for each of the listed expansion devices to detect whether they are set to be removable (Step S202).

Figure 7:
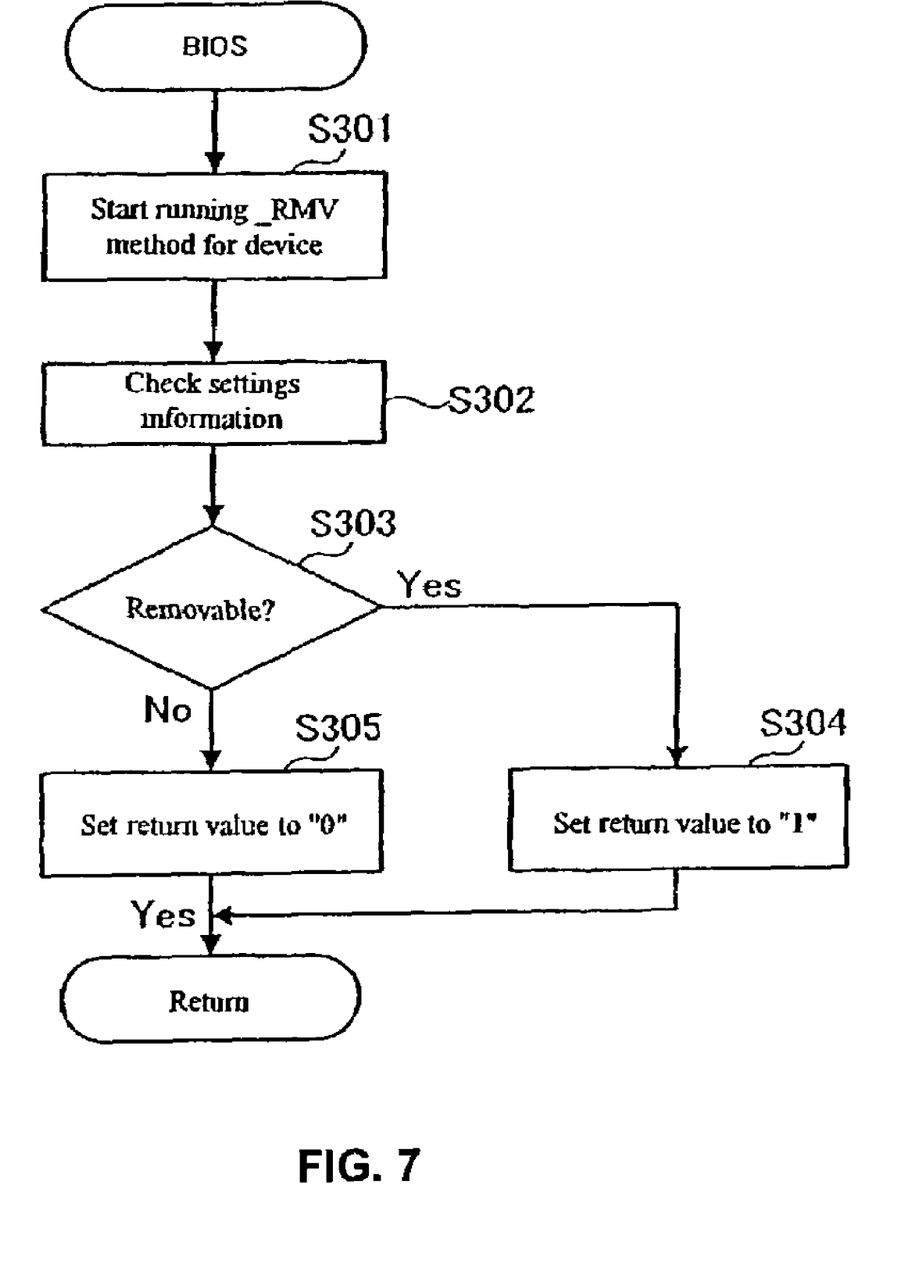
FIG. 7 is a diagram showing a flow of processes executed by BIOS when the PC starts up.

FIG. 7 shows details of the procedure run by the BIOS for each of the expansion devices listed by the OS. First, the BIOS starts to run the _RMV method for the expansion devices to be processed. It checks the settings information stored in the NVRAM 43 (actually, the data copied from the NVRAM 43 to the main memory 16 during the execution of POST) to see whether the expansion devices are set to be removable (Steps S301 to S303).

If it turns out that a given expansion device is set to be removable (Enabled) in the settings information stored in the NVRAM 43, the return value from the BIOS to the OS is set, for example, to "1" (Step S304). If an expansion device is set to be irremovable (Disabled), the return value from the BIOS to the OS is set, for example, to "0" (Step S305). The return value set in this way is sent from the BIOS to the OS.

Upon receiving the return value from the BIOS (Step S203), the OS judges whether the return value resulting from the _RMV method executed by the BIOS is "0" (Step S204). If the return value is "0," the OS stores information on the expansion device in the main memory 16 by attaching "Irremovable" status (Step S205). If the return value is not "0," the OS skips Step S205. That is, "Irremovable" status is not attached to the information on the expansion device.

Each time the processing of one expansion device is completed, the OS judges whether all the expansion devices connected to the PC 10 have been listed. If the listing has not been completed, the OS returns to Step S201 and continues processing (Step S206).

When all the expansion devices connected to the PC 10 have been listed, the processing is finished. Consequently, the main memory 16 now contains information (hereinafter referred to as "list information") which corresponds to the settings information stored in the NVRAM 43.

If the user wants to remove an expansion device from a card bus slot 23, IEEE connector 25, or USB connector 30 after the PC 10 is started, the user clicks the designated icon M displayed on the LCD 18. In response, the OS extracts those expansion devices that do not have "Irremovable" status attached thereto, out of the expansion devices connected to the PC 10 with reference to the list information in the main memory 16 and displays them in the list L. Consequently, for the user, the expansion devices with "Irremovable" status are not displayed in the list L, making it impossible for the user to perform any operation to remove the expansion devices.

According to the above configuration, the user specifies in advance those expansion devices that he/she does not want to remove, out of the expansion devices which are attachable/detachable with respect to the PC 10, and the specified expansion devices are excluded from the list L displayed later for the user to select an expansion device to remove.

This prevents the user to remove unintended expansion devices by mistake and improves the usability of the PC 10.

Besides, according to the above configuration, whether to display expansion devices in the list L is specified to the BIOS. It is also possible to make such settings on the OS if they only involve specifying whether to display expansion devices in the list L. If settings are changed on the OS, however, since there is no way to inform the BIOS of the changes, inconsistencies may arise between the settings information retained by the OS and the device information known to the BIOS. In contrast, according to the above configuration in which the user specifies to the BIOS whether to display expansion devices in the list L, there will be no inconsistency with the information held by the OS because the BIOS, which serves the function of recognizing device states, will reference the information in the NVRAM 43 as required.

Incidentally, although expansion devices handled in the above embodiment are PC cards 24, IEEE devices 26, and USB devices 35 connected to the card bus slots 23, IEEE connector 25, and USB connectors 30, this is not restrictive.

Figure 8:
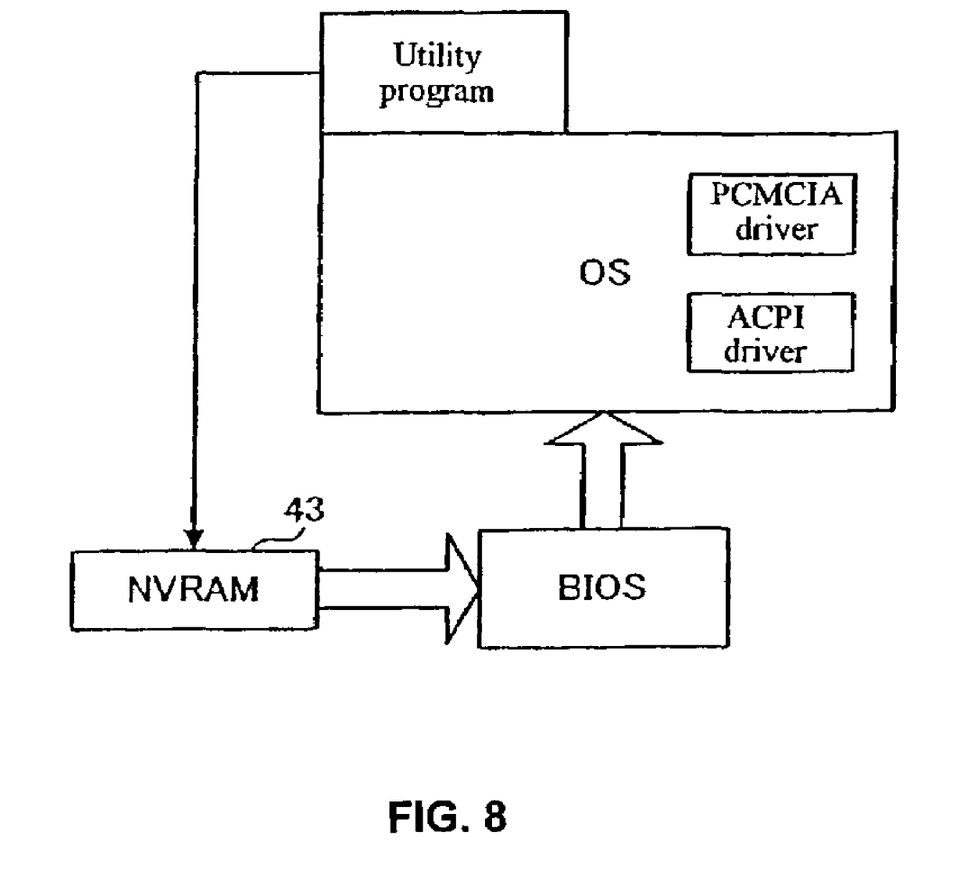
FIG. 8 is a diagram showing another flow of settings/processes for displaying the list shown in FIG. 2.

Besides, although according to the above embodiment, whether to permit removal of expansion devices is specified in the BIOS setup mode, this is not restrictive. As shown in FIG. 8, it is also possible to make a utility program running on the OS write settings information on expansion devices in the NVRAM 43. In that case, the utility program performs exactly the same flow of processes as in FIG. 4 to store user settings in the NVRAM 43.

Also, the program which makes settings for expansion devices, such as the one described with reference to the above embodiment, may take the form of an application program or BIOS update program.

Furthermore, such a program may be provided by means of a storage medium or program-transmission device as follows. Specifically, the program to be executed by a computer device only needs to be stored in a CD-ROM, DVD, memory, hard disk, or the like in computer-readable form. The program-transmission device only needs to comprise storage means such as a CD-ROM, DVD, memory, hard disk, or the like which stores the program; and transmission means for reading the program from the storage means and transmitting it to the apparatus which executes the program, via a connector or via a network such as the Internet or a LAN. Such a program-transmission device is suitable for installing a program which runs processes such as those described above, from a server via a network.

Besides, it is also possible to eclectically adopt the configuration used in the above embodiment or change it to another configuration as required without departing from the spirit and scope of the present invention.

In the drawings and specifications there has been set forth a preferred embodiment of the invention and, although specific terms are used, the description thus given uses terminology in a generic and descriptive sense only and not for purposes of limitation. As described above, the present invention can prevent unexpected removal of expansion devices and improve the usability of the PC.

The invention claimed is:

1. Apparatus comprising:
   an interface which provides removable connection to a plurality of expansion devices;
   an information storage unit for storing settings information which indicates whether the expansion devices connected to said interface are removable; and
   a listing unit for listing the expansion devices removable from said interface, based on said settings information stored in said information storage unit;
   said information storage unit and said listing unit together comprising an interface which allows expansion devices to be attached and detached.

2. The apparatus according to claim 1, further comprising a setting change unit for changing said settings information stored in said information storage unit, based on outside requests.

3. The apparatus according to claim 1, wherein said information storage unit is a non-volatile memory which stores information referenced by BIOS (basic input/output system).

4. Apparatus comprising:
   an interface section having a plurality of interfaces, each interface providing removable connection to a plurality of expansion devices;
   a listing section for displaying a list based on settings information which indicates whether to permit removal of an expansion device from each of said interfaces;
   a specification acceptance section for accepting specification of a specific interface from among said interfaces contained in said list; and
   an unloading section for unloading a driver for the expansion device connected to said specific interface to allow the expansion device to be removed;
   said listing section and said specification acceptance section together comprising the plurality of interfaces which allow the expansion devices to be attached and detached.

5. The apparatus according to claim 4, wherein said listing section lists only the interfaces from which removal of expansion devices is permitted.

6. The apparatus according to claim 4, wherein said specification acceptance section accepts only the specification of the interfaces from which removal of expansion devices is permitted.

7. The apparatus according to claim 4, further comprising a choice acceptance section for accepting choices as to whether or not removal of the expansion device from each of the plurality of interfaces should be permitted.

8. A method comprising the steps of:
   displaying an explicit list of removable expansion devices in response to a certain operation, based on an information list which indicates whether the expansion devices are removable from a computer device;
   accepting specification of a specific expansion device from among the expansion devices listed explicitly; and
   unloading said specified specific expansion device from a system of said computer device.

9. The method according to claim 8, wherein said step of displaying said explicit list comprises steps in which:
   an OS (Operating System) of said computer device makes an inquiry to a BIOS;
   the BIOS replies as to whether or not each of the expansion devices is removable, with reference to the information list; and
   the OS indicates a list of removable expansion devices explicitly based on a reply from the BIOS.

10. The method according to claim 8, further comprising the steps of:
   receiving, from outside, settings concerning whether the expansion devices are removable from said computer device and generating settings information based on the received settings; and generating the information list with reference to said settings information during system startup of said computer device.

11. The method according to claim 10, wherein when the settings concerning whether or not the expansion devices are removable from said computer device are received from the outside, said step of generating settings information stores the settings information generated based on the received settings in a non-volatile memory which stores data referenced by a BIOS of said computer device.

12. A program product comprising:
a computer readable medium;
a computer executable program stored on said computer readable medium for execution on a computer device, said computer executable program being effective in executing the steps of:
detecting expansion devices connected to the computer device;
accepting specification as to whether or not removal of said detected expansion devices from the computer device is prohibited; and
displaying a list of expansion devices, excluding the expansion devices which are prohibited from being removed, when requested to display a list of the expansion devices connected to the computer device.

13. The program product according to claim 12, wherein said process of accepting specification is executed if a certain operation is performed during system startup of the computer device.

14. The program product according to claim 13, wherein said process of accepting specification stores information about said specification in a non-volatile memory which stores data referenced by a BIOS of the computer device.

15. The program product according to claim 14, wherein said process of displaying a list comprises:
a process in which an OS of the computer device asks the BIOS for information needed to display said list;
a process in which the BIOS provides information as to whether each of the expansion devices is removable, with reference to the information about said specification stored in said non-volatile memory; and
a process in which the OS displays a list of removable expansion devices based on the information provided by the BIOS.

* * * * *